United States Patent [19]

Jones et al.

[11] Patent Number: 5,197,692
[45] Date of Patent: Mar. 30, 1993

[54] ADAPTIVE FLUID MOUNT

[75] Inventors: Peter J. Jones, Erie, Pa.; Marshall W. Downing, Chambourcy, France

[73] Assignee: Lord Corporation, Erie, Pa.

[21] Appl. No.: 706,622

[22] Filed: May 29, 1991

[51] Int. Cl.$^5$ .............................................. B64D 27/00
[52] U.S. Cl. ...................................... 244/54; 188/320; 267/140.12; 267/140.13; 248/636; 248/557
[58] Field of Search ............... 244/54; 267/140.1, 219; 180/312; 248/636, 550–557, 562, 566, 554–557; 280/707; 188/299, 312, 315, 322, 320

[56] References Cited

U.S. PATENT DOCUMENTS

| | | | |
|---|---|---|---|
| 4,483,521 | 11/1984 | Kakimoto | 267/219 |
| 4,666,016 | 5/1987 | Abe et al. | 267/140.1 |
| 4,681,306 | 7/1987 | Hofmann et al. | 267/140.1 A |
| 4,699,099 | 10/1987 | Arai et al. | 267/35 |
| 4,709,779 | 12/1987 | Takehara | 267/140.1 |
| 4,720,087 | 1/1988 | Duclos et al. | 267/140.1 |
| 4,733,758 | 3/1988 | Duclos et al. | 188/267 |
| 4,739,979 | 4/1988 | Kanda | 188/320 |
| 4,789,143 | 12/1988 | Smith et al. | 267/140.1 |
| 4,796,874 | 1/1989 | Hoying et al. | 267/140.1 |
| 4,796,876 | 1/1989 | Sciortino | 267/140.1 |
| 4,811,919 | 3/1989 | Jones | 244/54 |
| 4,840,357 | 6/1989 | Jouade | 267/140.1 C |
| 4,854,560 | 8/1989 | Lun | 267/140.1 |
| 4,867,263 | 9/1989 | Sugino et al. | 180/291 |
| 4,869,478 | 9/1989 | Bouhours et al. | 267/140.1 A |
| 4,886,252 | 12/1989 | Häussermann | 267/140.1 |
| 4,896,867 | 1/1990 | Schyboll et al. | 267/140.1 |
| 4,899,996 | 2/1990 | Maassen et al. | 267/219 |
| 4,909,490 | 3/1990 | de Fontenay | 267/140.1 |
| 4,936,423 | 6/1990 | Karnopp | 188/299 |
| 4,962,915 | 10/1990 | Thorn | 267/219 |
| 4,964,623 | 10/1990 | Thorn | 261/140.1 C |
| 4,969,632 | 11/1990 | Hodgson et al. | 267/140.1 |
| 5,039,073 | 8/1991 | Reichard et al. | 267/140.1 |

FOREIGN PATENT DOCUMENTS 0292940 12/1987 Japan ..................... 267/140.1 C Primary Examiner—Galen Barefoot
Attorney, Agent, or Firm—R. K. Thomson

[57] ABSTRACT

A double pumper mount useful as a front mount for an aircraft engine. A pair of fluid chambers are selectively interconnectable by one of a plurality of inertia tracks by use of an adjustable cylindrical member which has the tracks formed as generally helical grooves extending about the periphery of the cylindrical member. These inertia tracks have different flow characteristics so as to produce differing notch frequencies so as to attenuate different vibrational frequencies. A second embodiment has a single inertia track whose length can be altered by rotating the cylindrical member to change the point at which the ingress/egress port of the fluid chamber engages the circumferential portion of the inertia track.

15 Claims, 4 Drawing Sheets

ADAPTIVE FLUID MOUNT

BACKGROUND AND SUMMARY OF THE INVENTION

The present invention is directed to an improved fluid mount for isolating a source of vibration, such as an aircraft engine or the like, from its support structure. More particularly, the present invention is an improvement, for certain applications, over the fluid mount described in U.S. Pat. No. 4,811,919, which is hereby incorporated by reference.

As described in that commonly assigned patent and as shown in FIGS. 1, 2 and 3 thereof, a fluid mount is used to isolate the forward bulkhead 12 of engine E from beam 11 which is attached to pylon P. An external tube 45 interconnects a pair of fluid chambers and serves as an inertia track, attenuating vibrational energies for a particular design frequency by means of fluid inertia. As the '919 patent indicates, different frequencies can be attenuated by changing tube 45, i.e., by altering the length (L) to area (A) ratio of the inertia track.

The problems with the system depicted in '919, for applications where inertia track changeout is desirable, are twofold. First, although changing the tube has been simplified, the fact that changeout is necessary creates difficulties. In an engine test environment where time is money, having to break down the system, change tube 45 for one having a different length to area ratio, repressurize the fluid, carefully bleed all air from the fluid chambers to enable a second test to be run to determine which tube L/A ratio provides better overall performance, costs a significant amount more than is reflected by the hydraulic fluid which is lost during changeout. Such a changeout will also be an expensive proposition should it be desirable to replace inertia track 45 once the mount has been installed on an aircraft since any down time for such maintenance means taking the plane out of operation.

Second, since in actual operation, only a single inertia track can be used, a single notch frequency can be provided to cope with vibrational frequencies which is tuned for only one mode of operation. The troublesome frequencies during takeoff, for example, will, for most engines, be significantly different than the vibrational frequencies during normal cruise operations. Accordingly, tuning the fluid mount to isolate vibration in one operational mode will sacrifice some performance for most, if not all, other modes of operation.

It is among the purposes of the present invention to overcome the difficulties associated with this type of fluid mount. In a first preferred embodiment, a digitally adaptive mount is provided by an adjustable member for interconnecting first and second fluid chambers of a double pumper mount each of which has an ingress/egress port, in which the adjustable member has a plurality of fluid inertia tracks, each with a first terminal end portion, which may be selectively interconnected with the first ingress/egress port and a second terminal end portion simultaneously connectable with the second ingress/egress port. Preferably, these tracks are provided as helical passageways or grooves cut spirally about an external surface of the cylindrical adjustable member, each passageway providing a different notch frequency resulting from its unique L/A ratio. In a test environment, the cylindrical adjustable member may be adjusted to and locked in one of its three positions for a first engine test. Subsequent second and third test runs can be made without the need to break down the system into its components, thereby avoiding the need to depressurize/repressurize the hydraulic system. In actual use with an aircraft, the plurality of inertia tracks can each be designed with an L/A ratio to optimize the performance parameters for a particular operating condition. A simple diagnostic/control circuit can be provided along with a simple motor to adjust the mount to provide optimum performance in response to the conditions sensed by the circuit.

In a second embodiment, a continuously adaptive inertia track is provided. First and second at least partially annular grooves, any portion of which can interface with the two ingress/egress ports of the two fluid chambers, are formed on the circumference of the cylindrical adjustable member and are interconnected by a single helical groove. By rotating the cylindrical member through some portion of up to about 270°, the effective length of the inertia track is adjusted by adding or subtracting a portion of the length of the first partially annular groove, up to the 270° limit, to and from the length of the helical groove. The second annular groove is intentionally large to minimize its inertial effects from the system. This second groove is of such a size that the fluid system views it as being a portion of the second fluid chamber.

Various other features, characteristics and objectives of the present invention will become apparent after a reading of the following detailed description of the invention.

DETAILED DESCRIPTION OF THE PREFERRED EMBODIMENTS

Figure 1:
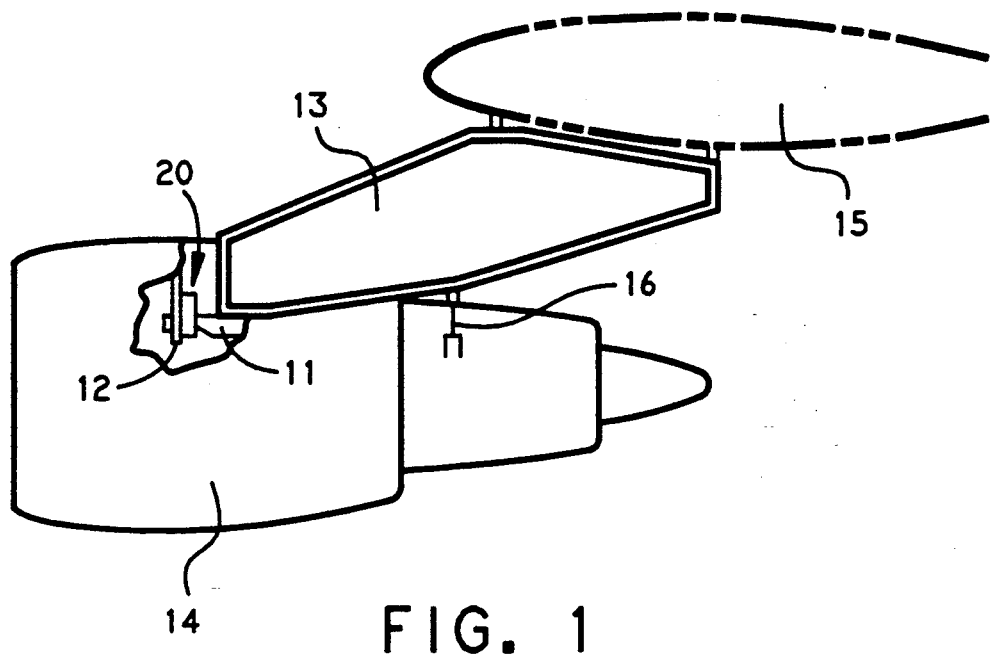
FIG. 1 is a schematic side elevation of the engine, pylon and wing which form the environment in which both the '919 mount and the mount of the present invention are utilized.

FIG. 1 schematically depicts the environment in which the hydraulic double pumper mount 20 of the present invention may typically be used, although other uses will become apparent as well. Mount 20 is shown interconnecting bulkhead 12 of engine 14 with beam 11 which is fixed to pylon 13 below aircraft wing 15. The purpose of hydraulic mount 20 is to isolate engine 14 from pylon 13 to minimize the transmission of vibration to the wing 15 and hence, to the passenger compartment (not shown). Hydraulic mount 20 is a front mount, and will most typically be used with a rear mount 16 which forms no part of the present invention.

Figure 2:
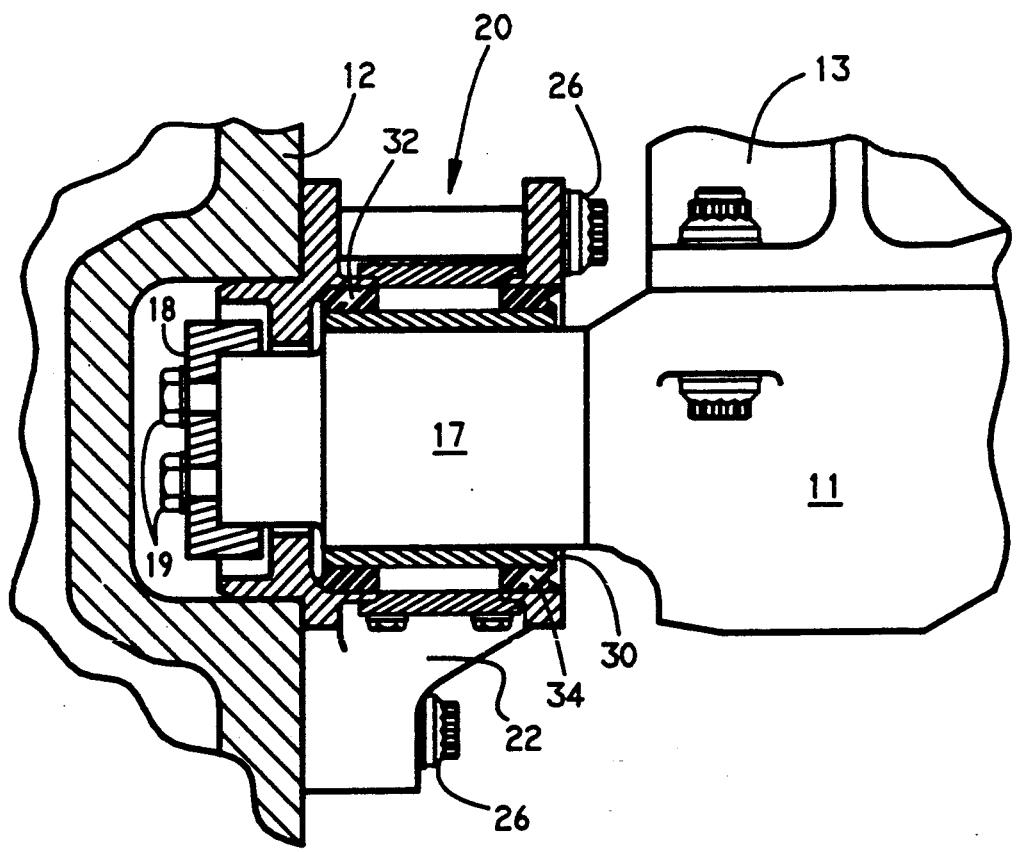
FIG. 2 is a side view in partial section showing the improved mount of the present invention in operative position.
Figure 3:
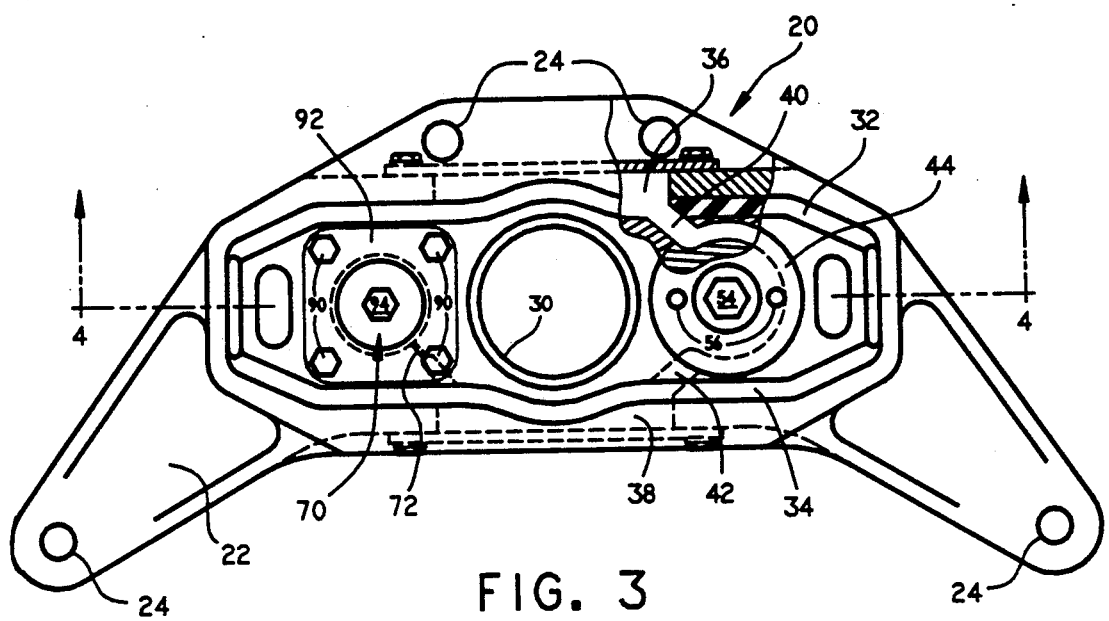
FIG. 3 is a front view of the improved mount, with portions broken away for clarity.

As better seen in FIGS. 2 and 3, hydraulic mount 20 comprises a rigid outer frame member 22 which can be fastened to bulkhead 12 through holes 24 by bolts 26. Rigid connector 30 receives stub shaft 17 which extends from beam 11. Elastomeric layers 32 and 34 isolate connector 30 from outer frame member 22. End cap 18 is affixed to the end of stub shaft 17 by bolts 19 to prevent widthdrawal of stub shaft 17 from outer frame 22.

Figure 4:
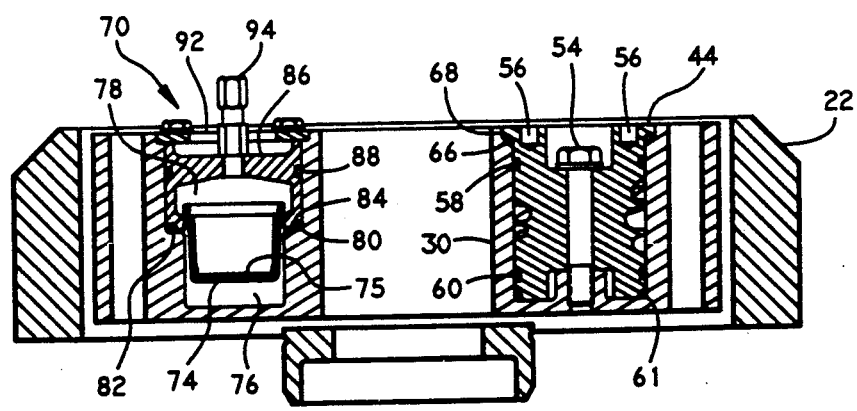
FIG. 4 is a cross-sectional side view taken along line 4—4 of FIG. 3.
Figure 5:
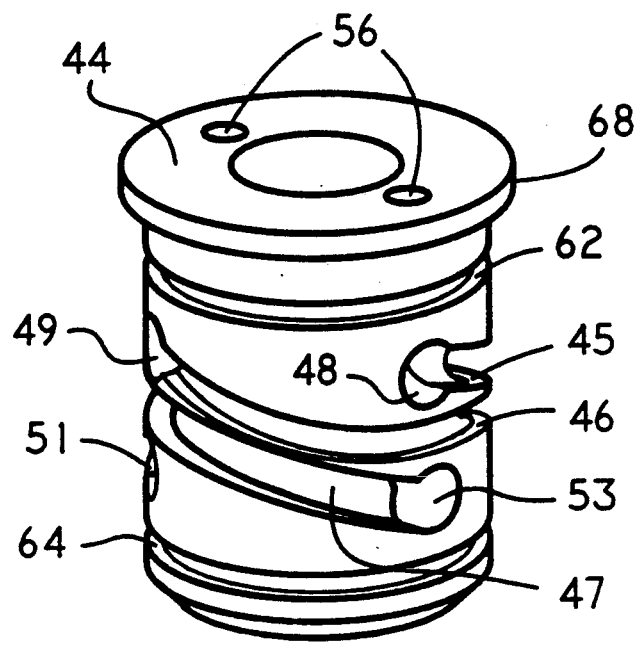
FIG. 5 is a perspective view of a first embodiment of the cylindrical member upon which the inertia tracks are formed.

In addition to elastomeric layers 32 and 34, upper fluid chamber 36 and lower fluid chamber 38 further serve to isolate rigid connector 30 from outer frame member 22. Upper fluid chamber 36 has a first ingress/egress port 40 and lower fluid chamber 38 has a second ingress/egress port 42. These two ports 40 and 42 are interconnected through a cylindrical member 44 which is best seen in FIGS. 4 and 5. In this first preferred embodiment, cylindrical member 44 has a plurality of inertia tracks formed by cutting grooves in the circumferential face of the cylindrical member 44.

As shown in FIG. 5, the plurality of inertia tracks number three: a first track 45 having a first terminal end portion 48 and a second terminal end portion 51, a second inertia track 46 having a first terminal end portion 49 and a second terminal end portion (not shown), and a third inertia track 47 having a first terminal end portion (not shown) and a second terminal end portion 53. First (48 and 49) and second (51 and 53) terminal end portions have been depicted as having enlarged dimensions that are generally equal to the size of ingress/egress ports 40 and 42, respectively, and positioned at angles that generally match those of their respective ports. While such a configuration is desirable to facilitate fluid flow, it will be appreciated that the terminal end portions might also be dimensioned as their respective fluid inertia tracks 45, 46 and 47 and simply comprise the ends of the groove forming said track.

The first terminal end portions 48 and 49 are generally (though not exactly) equally spaced about the periphery and all occupy the same vertical plane which is that of ingress/egress port 42. The reason the terminal end portions are not exactly equally spaced has to do with the variations in width of their respective inertia tracks and the need to fit those tracks about the periphery in non-intersecting paths. Similarly, the second terminal end portions 51 and 53 are substantially equally spaced and are coplanar with ingress/egress port 40. More importantly, first and second pairs of terminal end portions are spaced by an amount equal to the angular spacing between ports 40 and 42.

As best seen in FIGS. 3 and 4, in the test apparatus configuration, cylindrical member 44 is locked in place in one of its three aligned positions by bolt 54 so that one of the inertia tracks 45, 46 or 47 interconnects upper fluid chamber 36 with lower fluid chamber 38. It is preferred that the upper surface of member 44 and the face of mount 20 surrounding member 44 have indicia (not shown) etched thereon to facilitate adjustment. By loosening bolt 54 and inserting a specially configured spanner wrench (not shown) into recesses 56, cylindrical member 44 can be adjusted to one of its other positions to align an alternate inertia track having different flow characteristics (i.e., L to A ratio) with ports 40 and 42.

O-rings 58 and 60 positioned in grooves 62 and 64 seal off undesired fluid flow in a longitudinal direction along the length of the cylindrical member 44 and serve as the primary fluid sealing system. A secondary or backup sealing system is formed by O-ring 66 which is seated beneath flange 68 and is compressed when locking bolt 54 is fully secured and by O-ring 61 positioned on the lower peripheral edge of cylindrical member 44. It will be appreciated, however, that even during adjustment when the secondary sealing system is basically inactivated to permit rotation of member 44, O-rings 58 and 60 provide complete sealing of the fluid. Accordingly, in the test apparatus configuration depicted in FIGS. 3 and 4, when the mount 20 is bolted into position, three different sets of data can be taken for the three inertia tracks 45, 46 and 47 without the need to tear the test stand apart into its components, insert a different inertia track or mount, repressurize the mount, with the resultant loss of time and fluid.

A volume compensator 70 of the type taught in the '919 patent is interconnected to the lower fluid chamber 38 through opening 72. An elastomeric bladder 74 separates hydraulic fluid chamber 76 of the volume compensator 70 from the pneumatic portion 78. Rigid cup member 75 is seated within bladder 74 and connected thereto, if at all, only along its base, to maintain the shape of the bladder substantially as shown. Lateral edge 80 of bladder is compressed between ledge 82 and the bottom edge 84 of upper member 86 to seal off the two chamber portions. O-ring 88 provides a secondary seal for preventing leakage of hydraulic and pneumatic fluid. Bolts 90 secure cover plate 92 in position and valve 94 provides means to variably pressurize chamber 78.

Figure 6:
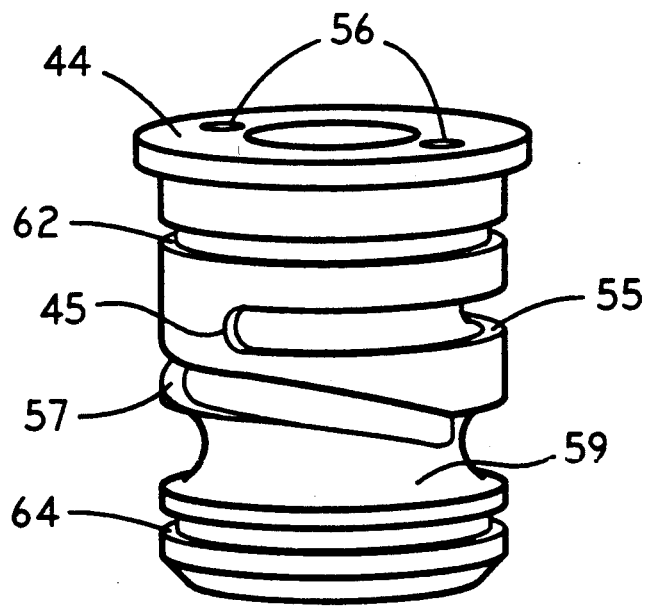
FIG. 6 is a perspective view of a second embodiment of the cylindrical member upon which the inertia track is formed; and, FIG. 7 is a block diagram showing the electronic control circuit utilized to provide automatic adjustment of the fluid mount of the present invention to optimize engine performance.

A second embodiment of cylindrical member 44 is shown in FIG. 6. In this embodiment, there is only a single inertia track 45 having a first horizontal or circumferential portion 55 that extends about the periphery for an angular extent of up to about 270°. Any larger horizontal extension would render the inclined portion 57 too steep and might generate turbulent flow as a result of the discontinuities of the flow path. Inclined portion 57 extends from horizontal portion 55 to an enlarged annular groove 59. Annular groove 59 has been made of such a large dimension, as to become part of the upper fluid chamber 36. Thus, annular groove 59 becomes part of the upper fluid reservoir with ingress/egress port 40 being capable of interfacing with any portion thereof and groove 59 is dynamically removed, for all intents and purposes, from the fluid system providing deminimis fluid inertia. Were this embodiment of the cylindrical member not to be so constructed, as an attempt to adjust the effective length of inertia track 45 was being made by subtracting or adding a portion of the length of horizontal portion 55 by rotating cylindrical member 44 to change the point at which ingress/egress port 42 engaged circumferential portion 55, an equivalent length would be added or substracted from annular groove 59 negating the adjustment.

Figure 7:
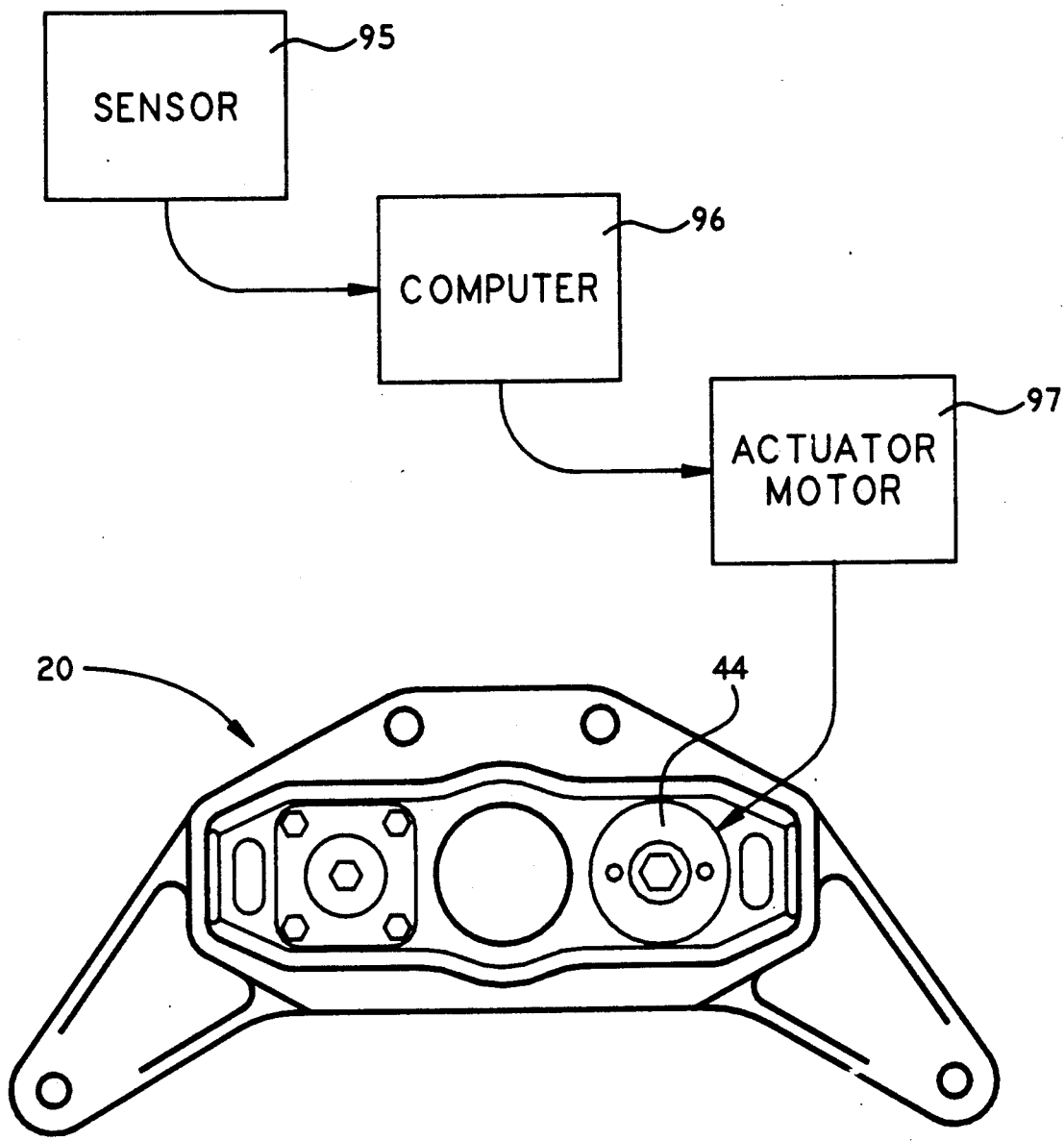

Although the embodiment described thus far, employ manual adjustment means for cylindrical member 44, automatic adjustment means could readily be provided as depicted in FIG. 7. As shown therein, a sensor 95 is provided to detect the operating characteristics of the engine 14. Such a sensor might be a tachometer to determine the rpm's of the engine's turbine or a position sensor of some portion of the engine or pylon structure to determine the amount of vibration occurring or being transmitted. Output from sensor 95 is then fed to a computer 96, or other diagnostic means, to analyze the detected condition and determine which position of cylindrical member 44 (depending on whether the first or second embodiment is in use) will optimize performance. This will be done by comparing the operating characteristics to baseline information stored in the computer 96, such as the notch frequency for the particular inertia track or position thereof. Computer 96 then feeds a signal to actuator motor 97 to rotate cylindrical member 44 to the appropriate position. It will be appreciated that in this automatically adjusted mode of operation, lock bolt 54 will not be tightened to the degree it is in the manual embodiment but, rather will serve only to preclude disassembly. The actuator motor 97 will provide the desired axial pressure to seat the secondary seals 61 and 66.

The present double pumper mount 20 provides a cylindrical member 44 which has one or more inertia tracks 45 (46 and 47, in the first embodiment) that can be selectively positioned to interconnect the upper and lower fluid chambers 36 and 38. Since these chambers 36 and 38 have the same effective piston areas, the amount of fluid pumped in one direction will be equal to the amount pumped in the opposite direction for an equivalent movement. By providing an inertia track (or tracks) for which the flow characteristics are variable (that is, an adjustment capability for the length to area ratio), the notch frequency can be altered to provide different vibration attenuation for the several operational modes of the engine (e.g., takeoff, cruise, and reduced throttle or landing). Accordingly, vibrations can be attenuated for these multiple frequencies both in a test apparatus and in actual operation, without the need to teardown the engine mount interface into its component parts, as has been the case in the past.

Certain changes, alternatives and modifications will become apparent to a person of ordinary skill in the art following a reading of the foregoing description. It is intended that all such changes, alternatives and modifications as fall within the scope of the appended claims be considered part of the present invention.

I claim:

1. A resilient hydraulic mount for use as a component in a system for connecting a vibrating member such as an engine to a support, said resilient mount comprising:
    a) a rigid frame member adapted to be attached to said support;
    b) a rigid connector for supporting said vibrating member;
    c) an elastomeric element for isolating said rigid connector from said rigid frame member, said elastomeric element including
        i) a first fluid chamber having a first ingress/egress port;
        ii) a second fluid chamber having a second ingress/egress port;
        iii) a plurality of fluid inertia tracks which can be selectively interconnected between said first and second ingress/egress ports, each of said fluid inertia tracks including a first terminal end portion connectable with said first ingress/egress port and a second terminal end portion which is simultaneously connectable with said second ingress/egress port; and
    d) means to select which of said plurality of fluid inertia tracks is interconnected with said first and second ingress/egress ports without a need to break down the system into its components thereby avoiding a resultant loss of hydraulic fluid.

2. The resilient mount of claim 1 wherein each of said plurality of fluid inertia tracks is formed as a substantially helical passageway on an external face of a cylindrical member.

3. The resilient mount of claim 2 wherein said plurality of said fluid inertia tracks comprise at least three substantially helical passageways.

4. The resilient mount of claim 3 wherein said first terminal end portions of said at least three substantially helical passageways are approximately equally spaced about the periphery of said cylindrical member and are coplanar.

5. The resilient mount of claim 4 wherein said second terminal end portions of said at least three substantially helical passageways are approximately equally spaced about the periphery of said cylindrical member and are coplanar.

6. The resilient mount of claim 5 wherein said means to select comprises means to rotationally align and secure said cylindrical member in one of a plurality of aligned orientations relative to said first and second ingress/egress ports.

7. The resilient mount of claim 6 wherein said means to select comprises sensor means to detect the operating parameters of said vibrating member, diagnostic means to determine which of said fluid inertia tracks is most appropriate to optimize said operating parameters, and means to rotate said cylindrical member to a proper orientation to interconnect said first and second terminal end portions of said most appropriate fluid inertia track with said first and second ingress/egress ports, respectively.

8. The resilient mount of claim 2 further comprising means to fluidically seal a top portion and a bottom portion of said cylindrical member within a cylindrical chamber.

9. The resilient mount of claim 8 wherein said seal means comprises means to doubly seal at least said top portion of said cylindrical member in said cylindrical chamber.

10. The resilient mount of claim 1 wherein said menas to select comprises sensor means to detect the operating parameters of said vibrating member, diagnostic means to determine which of said fluid inertia tracks is most appropriate to optimize said operating parameters, and means to align said most appropriate inertia track so as to interconnect said first and second terminal end portions thereof with said first and second ingress/egress ports, respectively.

11. The resilient mount of claim 1 wherein the means to select comprises manual means to position a first inertia track in communication with said first and said second ingress/egress ports and manually securable locking means to secure said inertia track in said first position.

12. A resilient hydraulic mount for use as a component in a system for connecting a vibrating member such as an aircraft engine to a support, said resilient mount comprising:
    a) a rigid frame member adapted to be attached to said support;
    b) a rigid connector for supporting said vibrating member;
    c) an elastomeric element for isolating said rigid connector from said rigid frame member, said elastomeric element including
        i) a first fluid chamber having a first ingress/egress port;

ii) a second fluid chamber having a second ingress/egress port;
iii) a cylindrical adjustable member having a passageway for interconnecting said first and second fluid chambers, said passageway including an inertia track formed as a groove extending about the periphery of said cylindrical adjustable member, said groove having a first circumferential portion and a second helical portion, said circumferential portion affording a means of adjusting a point of connection of said first ingress/egress port with said passageway of said adjustable member, and a large annular groove extending about the cylindrical adjustable member at an opposite end of said helical portion, said large circumferential groove being of sufficient dimension to substantially eliminate its contribution to the fluid inertia of said passageway interconnecting said first and second ingress/egress ports;
d) means for adjusting said adjustable member to alter the point of connection of said first ingress/egress port to said passageway.

13. The resilient mount of claim 12 wherein the means for adjusting comprises manual means to position a first inertia track in communication with said first and said second ingress/egress ports and manually securable locking means to secure said inertia track in said first position.

14. The resilient mount of claim 12 wherein said means for adjusting comprises sensor means to detect the operating parameters of said vibrating member, diagnostic means to determine which of said fluid inertia tracks is most appropriate to optimize said operating parameters, and means to align said most appropriate inertia track so as to interconnect said first and second terminal end portions thereof with said first and second ingress/egress ports, respectively.

15. A resilient hydraulic mount for use as a component in a system for connecting a vibrating member such as an aircraft engine to a support, said resilient mount comprising:
a) a rigid frame member adapted to be attached to said support;
b) a rigid connector for supporting said vibrating member;
c) an elastomeric element for isolating said rigid connector from said rigid frame member, said elastomeric element including
  i) a first fluid chamber having a first ingress/egress port at a first position;
  ii) a second fluid chamber having a second ingress/egress port at a second position which is laterally and angularly displaced from said first position;
  iii) a cylindrical adjustable member having at least one passageway for interconnecting said first and second fluid chambers, said at least one passageway including at least one inertia track formed as a groove extending about the periphery of said cylindrical adjustable member, said groove including a helical portion, a first terminal end portion for connecting to said first ingress/egress port and a second terminal end portion for connecting to said second ingress/egress port;
d) means for adjusting a length to area ratio of said inertia track to thereby alter the characteristics of said at least one inertia track, wherein said means for adjusting said length to area ratio comprises means for rotating said adjustable cylindrical member to vary a position at which said first ingress/egress port engages said first terminal end portion and to vary a position at which said second ingress/egress port engages said second terminal end portion.

* * * * *